United States Patent
Li et al.

(10) Patent No.: US 9,307,119 B2
(45) Date of Patent: Apr. 5, 2016

(54) SYSTEMS AND METHODS FOR COMPUTATION-EFFICIENT IMAGE PROCESSING SYSTEM ARCHITECTURE

(75) Inventors: Xing Li, Webster, NY (US); David Jon Metcalfe, Marion, NY (US); Meng Yao, West Linn, OR (US); Michael Dale Stevens, Portland, OR (US); Paul W. Phillippi, Sherwood, OR (US)

(73) Assignee: XEROX CORPORATION, Norwalk, CT (US)

( * ) Notice: Subject to any disclaimer, the term of this patent is extended or adjusted under 35 U.S.C. 154(b) by 388 days.

(21) Appl. No.: 13/587,331

(22) Filed: Aug. 16, 2012

(65) Prior Publication Data

US 2014/0050269 A1  Feb. 20, 2014

(51) Int. Cl.
 *H04N 1/56* (2006.01)
 *G06K 1/12* (2006.01)

(52) U.S. Cl.
 CPC ................................. *H04N 1/56* (2013.01)

(58) Field of Classification Search
 None
 See application file for complete search history.

(56) References Cited

U.S. PATENT DOCUMENTS

| | | | |
|---|---|---|---|
| 7,551,780 B2 * | 6/2009 | Nudd et al. | 382/190 |
| 7,672,543 B2 * | 3/2010 | Hull et al. | 382/305 |
| 7,702,673 B2 * | 4/2010 | Hull et al. | 707/707 |
| 8,156,115 B1 * | 4/2012 | Erol et al. | 707/728 |
| 8,156,427 B2 * | 4/2012 | Graham et al. | 715/254 |
| 2007/0047781 A1 * | 3/2007 | Hull et al. | 382/124 |
| 2010/0259775 A1 * | 10/2010 | Sakamoto | 358/1.9 |
| 2010/0277770 A1 * | 11/2010 | Yao | 358/3.06 |
| 2010/0290089 A1 * | 11/2010 | Stevens | 358/3.06 |
| 2011/0051197 A1 * | 3/2011 | Yao et al. | 358/3.06 |
| 2011/0243429 A1 | 10/2011 | Yao | |
| 2012/0020570 A1 | 1/2012 | Yao et al. | |
| 2012/0069357 A1 | 3/2012 | Yao | |

* cited by examiner

*Primary Examiner* — Jay Patel
*Assistant Examiner* — Reza Aghevli
(74) *Attorney, Agent, or Firm* — MH2 Technology Law Group LLP

(57) ABSTRACT

Embodiments relate to systems and methods for a computation-efficient image processing system architecture. Image data can be transmitted from a computer, online service, and/or other image source to an output device having a set of image processing modules in two or more image paths, including an edge detection module and a video decoding module. The edge detection module can produce edge tag output, and the video decoding module, operating in parallel, can generate decoded video output. The edge tag output and decoded video output can be transmitted to a set of downstream image processing modules, including modules for color trapping, edge smoothing, and other operations. Because earlier processing stages share information with downstream modules which require the same or related data, redundant processing can be reduced or eliminated. Complex image operations can therefore be carried out, and high-quality output can be generated, without sacrificing responsiveness.

16 Claims, 5 Drawing Sheets

SYSTEMS AND METHODS FOR COMPUTATION-EFFICIENT IMAGE PROCESSING SYSTEM ARCHITECTURE

FIELD

The present teachings relate to systems and methods for a computation-efficient image processing system architecture, and more particularly, to platforms and techniques for generating an image output from an image input file which captures and re-uses outputs from multiple concurrent processing operations in the image path to apply complex image processing treatments without sacrificing output quality or system responsiveness.

BACKGROUND

In the field of image processing, a variety of techniques are known for treating and enhancing image input files for better output on a printer, copier, multi-function, or other output device. Those image processing techniques can include several classes and types of image processing operations, including operations related to edge detection and tagging as well as video decoding for the generation of binarized versions of video and/or image output. A further variety of intermediate image processing treatments and operations are also known, including those related to trapping black areas of an image, color estimation of areas of an image, halftoning, resolution enhancement, and other image processing operations, treatments, enhancements, or techniques.

However, in known output devices and their associated hardware, drivers, application and other software, the processing overhead involved in performing those techniques in parallel or succession can be considerable. When multiple stages in the image path call for the use of video decoding, edge detection, and other techniques, the ability of the device to render the eventual image output can be significantly affected. In some known systems, a device which is configured to apply multiple operations of these various kinds can require a user to switch the device into a special "high quality" mode, in which the speed of the printing or other output is slowed down due to the computational burdens involved.

It may be desirable to provide methods and systems for computation-efficient image processing system architecture, in which a user may be provided with the option to generate a comparatively high-quality finished image output, potentially including multiple image enhancements, without significantly affecting the responsiveness of the output process nor the rendering quality of the finished image.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for a computation-efficient image processing system architecture. More particularly, embodiments relate to platforms and techniques for performing a series of relatively intensive or complex image processing operations on an input image data, while preserving the responsiveness of the printer or other output system. In aspects, an input image data can be or include a digital still image, video frame, document, and/or other image source or representation, such as image data downloaded or accessed from a camera or other device, a database, a personal computer, an online service, and/or other image source. In aspects, the image data can be subjected to a coordinated series of image processing operations which occur along two or more main branches, including merely illustratively, a video decoding branch as well as an edge detection branch. In implementations, the video decoding can be performed in one branch to generate a decoded video output in binary format, in which individual pixels are assigned only a 0 or 1, or other binary representation or value. In implementations, the edge detection branch of the image pathway can apply edge detection operations to the input image data, to identify and isolate edges that may be present in the subject image. The detected edges can be tagged or recorded for purposes including the definition of areas of the image which contain textual or symbolic information, rather than purely image-related information. The edge tag output can then be used to drive text conversion and other downstream image processing operations. Various further processing stages can be applied to each of the decoded video output and the edge tag output, with intermediate steps and outputs being stored, shared, and/or merged into subsequent image processing steps. Because re-processing of different image processing workloads can be avoided, and intermediate outputs can be stored and leveraged by later stages, the efficiency of the processing required in the output device can be improved, and a greater flexibility in output quality and configuration can be achieved.

Reference will now be made in detail to exemplary embodiments of the present teachings, which are illustrated in the accompanying drawings. Where possible the same reference numbers will be used throughout the drawings to refer to the same or like parts.

Figure 1:
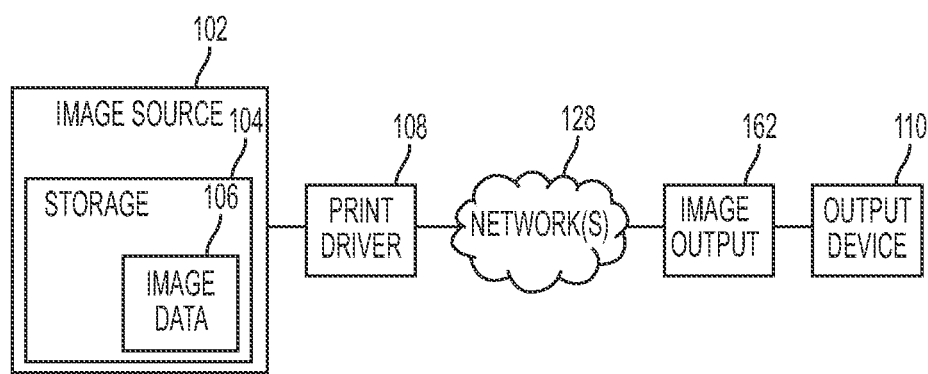
FIG. 1 illustrates an overall network in which systems and methods for a computation-efficient image processing system architecture can operate, according to various implementations.

FIG. 1 illustrates an overall network 100 in which systems and methods for a computation-efficient image processing system architecture can operate, according to aspects. In aspects as shown, the image source 102 can be or include, for instance, an imaging device such as a copy device or machine, a multi-function device or machine, a digital camera, video camera, a scanner, a computer such as a desktop, laptop, and/or server computer, and/or other device, platform, service, and/or hardware. In aspects, the image source 102 can generate, host, store, and/or maintain the image data 106 in storage 104, such as hard disk storage, optical storage, electronic memory, and/or other types of storage hardware or media, although it will be appreciated that in implementations such as a copy device or machine, the image data 106 may not be permanently stored or stored in file format in the image source 102. According to aspects, the image data 106 can be image data encoded, for example, in a comparatively high-resolution and/or high-color palette (e.g., 24- or 32-bit) format. The image data 106 can be encoded, merely for example, in LAB (lightness, a and b) format or color space specified in the International Commission on Illumination (CIE) 1976 color space standard. In aspects, the image data 106 can be encoded in other formats or according to other standards, such as the TIFF (Tagged Image File Format), the RAW file format, and/or others. According to aspects, as noted the image source 102 can be or include a device which captures and initially encodes or stores the image data 106, but can also be or include a device or service which receives and stores the image data 106 from one or more other sources, such as, for instance, an online digital photo storage site or service.

In aspects, the image source 102 can communicate with a print driver 108 via one or more networks 128. In aspects, the one or more networks 128 can be or include a local area network (LAN) such as an Ethernet™ network, a WiFi™ wireless network, and/or can be or include the Internet and/or a cloud-based network. Other public and/or private networks, channels or connections can be utilized to connect the image source 102 with the print driver 108 and/or other nodes or destinations. In aspects, the print driver 108 can be or include a print server, print service, application, and/or other hardware, software, application, and/or service. In aspects as shown, the print driver 108 can in turn be connected to an output device 110, such as a printer, multi-function device or machine, facsimile device or machine, display, and/or other device. In aspects, the print driver 108 can be connected directly to the output device 110 without an intervening set of one or more networks 128, such as by wired or wireless connections, and/or can be connected indirectly through intermediate servers, services, the Internet, and/or other connections or channels. In implementations, the print driver 108 and other associated logic and resources can be hosted entirely in the image source 102, such as in the hardware, software, firmware, applications, and/or services of a copy device or machine and/or multi-function printer or other device or machine.

The output device 110 according to aspects of the present teachings can be configured to incorporate systems and methods for a computation-efficient image processing system architecture, in various regards. More specifically and as for instance illustrated in FIG. 2, the output device 110 can comprise a set of hardware, software, application, service, and/or other resources, by which the image data 106 can be passed through an image path and ultimately printed and/or otherwise outputted by a hardware device. In aspects as shown, the image data 106 can be received in the output device 110, such as by user command or automatically, and processed according to user-selected and/or automatic or default settings for image features, enhancements, and/or output options. In aspects as shown, More specifically and as likewise illustrated in FIG. 2, the output device 110 comprise a number of modules and other resources configured to perform various image processing tasks. Those modules can be or include, for instance, physical modules such as general-purpose devices such as general-purpose microprocessor chips, digital signal processing (DSP) chips, application specific integrated circuits (ASICs), field programmable gate arrays (FPGAs), electronic memory, and/or other physical devices. In implementations, the modules can also or instead be or include graphics processing chips or circuits, and/or other dedicated or special-purpose chips or circuits. In aspects, the modules can in addition or instead be or include logical modules or software, such as applications, routines, utilities, services, and/or other software-based processing resources.

According to aspects, the image data 106 can be received in an edge detection module 114. In aspects, detection module 114 and/or other hardware, software, logic, application and/or service can be or include devices, platforms, logic, and/or techniques such as those described in co-pending U.S. patent application Ser. No. 12/467,441, filed May 18, 2009, entitled "METHOD AND SYSTEM FOR SELECTIVE SMOOTHING OF HALTONED OBJECTS USING BITMAP ENCODING", by Michael Dale Stevens, now published on Nov. 18, 2010 as U.S. Publication No. US-2010-0290089-A1, which application is assigned or under obligation of assignment to the same entity as this application, and which application is incorporated herein by reference in its entirety.

In implementations as shown, besides the current image data 106, the edge detection module 114 can also receive image data from a buffer 112, such as an electronic memory organized as a scan line buffer or otherwise, which stores scan lines from a previous set of image data processed by the output device 110. The buffer 112 can for instance store lines of image data for operations that need to access pixels in a context window.

The edge detection module 114 and/or other hardware, software, logic, application, and/or service can be configured to perform edge detection processing on the content of the image data 106 as well as data received via buffer 112, for instance by analyzing the contrast between different areas or contours of the content of the image data 106 and/or other image representation, object, and/or source. In aspects, the edge detection module 114 and/or other hardware, software, logic, application, and/or service can generate output that can include an edge tag output based on the edge detection processing, in which one or more detected edges contained in the image data 106 and/or other image representation, object, and/or source can be tagged, labeled, and/or otherwise identified for further processing purposes. In aspects, the edge tag output and/or other output generated by the edge detection module 114 and/or other hardware, software, logic, application, and/or service can be transmitted to an edge dilation module 118. The edge dilation module 118 can likewise receive data from a buffer 116, such as a scan line buffer likewise storing previously received image data. In aspects, the edge dilation module 118 can be configured to enlarge detected edges and/or surrounding areas. In aspects, the edge dilation module 118 can generate output including an edge dilation output, which can include an edge map comprising the image data 106 with detected edges enlarged. In aspects, the edge dilation module 118 can be configured to dilate detected edge(s) by different amounts and shapes, such as for example by one, two, three, or four pixels on one, two, three, or four sides, and so forth. In aspects, the edge dilation module 118 can also receive previous image data from the buffer 116. According to aspects, the edge dilation output produced by the edge dilation module 118 can be transmitted to a delay module 120, which can subject that image information in the image path to a predetermined or selectable delay. The delay imposed by the delay module 120 can synchronize edge detection and/or edge dilation with other parts of the image processing path. The delay can for instance consist of a predetermined number of scan lines. After traveling through the delay module 120, the image information can be received in a resolution expansion module 122.

In aspects, the resolution expansion module 122 can increase the resolution of the edge map generated by the edge dilation module 118. In aspects, the resolution expansion module 122 can also receive the previous image data via buffer 166, which can again likewise consist of a scan line buffer.

According to aspects, the image data 106 can also be transmitted to a video decoding module 126. In aspects, video decoding module 126 and/or other hardware, software, logic, application and/or service can be or include devices, platforms, logic, and/or techniques such as those described in the aforementioned co-pending U.S. patent application Ser. No. 12/467,441, filed May 18, 2009, entitled, "METHOD AND SYSTEM FOR SELECTIVE SMOOTHING OF HALF-TONED OBJECTS USING BITMAP ENCODING", by Michael Dale Stevens, now published on Nov. 19, 2010 as U.S. Publication No. US-2010-0290089-A1. In aspects, the video decoding module 126 and/or other hardware, software, logic, application and/or service can also or instead include other devices, platforms, logic, and/or techniques. The video decoding module 126 can, in implementations, be configured to generate decoded video output in a binary format or representation. In aspects, the video decoding module 126 and/or other hardware, software, logic, application, and/or service can transmit decoded video output to one or more downstream modules. In aspects as shown, the decoded video output can be transmitted to one or more downstream modules via a buffer 128 and/or a delay 144 module 128, to temporarily store required amounts of data, to maintain data in a synchronous timing stream, and/or for other purposes.

In implementations as shown, the decoded video output can be transmitted to a black trapping module 130, which can operate to locate black areas of the decoded video output. In aspects, the black trapping module 130 and/or other hardware, software, logic, application and/or service can be or include devices, platforms, logic, and/or techniques such as those described in co-pending U.S. patent application Ser. No. 12/548,783, filed Aug. 27, 2009, entitled "BITMAPPED BASED TRAPPING METHODS, APPARATUS AND SYSTEMS", by Meng Yao et al., now published on Mar. 3, 20122 as U.S. Publication No. US-2011-0051197-A1, which application is assigned or under obligation of assignment to the same entity as this application, and which application is incorporated herein by reference in its entirety. In aspects, the black trapping module 130 and/or other hardware, software, logic, application and/or service can also or instead include other devices, platforms, logic, and/or techniques.

In aspects, the decoded video output can also be transmitted from the video decoding module 126 and/or other hardware, software, logic, application, and/or service to a thin line growth module 158, which can operate to identify and enhance any detected thin lines in the decoded video output to thicken, darken, and/or otherwise enhance those graphical elements. In aspects, the thin line growth module 158 and/or other hardware, software, logic, application and/or service can be or include devices, platforms, logic, and/or techniques such as those described in co-pending U.S. patent application Ser. No. 12/841,663, filed Jul. 22, 2010, entitled "THIN LINE DETECTION AND ENHANCEMENT FOR ELECTRONIC IMAGES HAVING DIFFERENT RESOLUTIONS", by Meng Yao et al., now published on Jan. 26, 2012 as U.S. Publication No. US-2012-0020570-A1, which application is assigned or under obligation of assignment to the same entity as this application, and which application is incorporated herein by reference in its entirety. In aspects, the thin line growth module 158 and/or other hardware, software, logic, application and/or service can also or instead include other devices, platforms, logic, and/or techniques.

Figure 2:
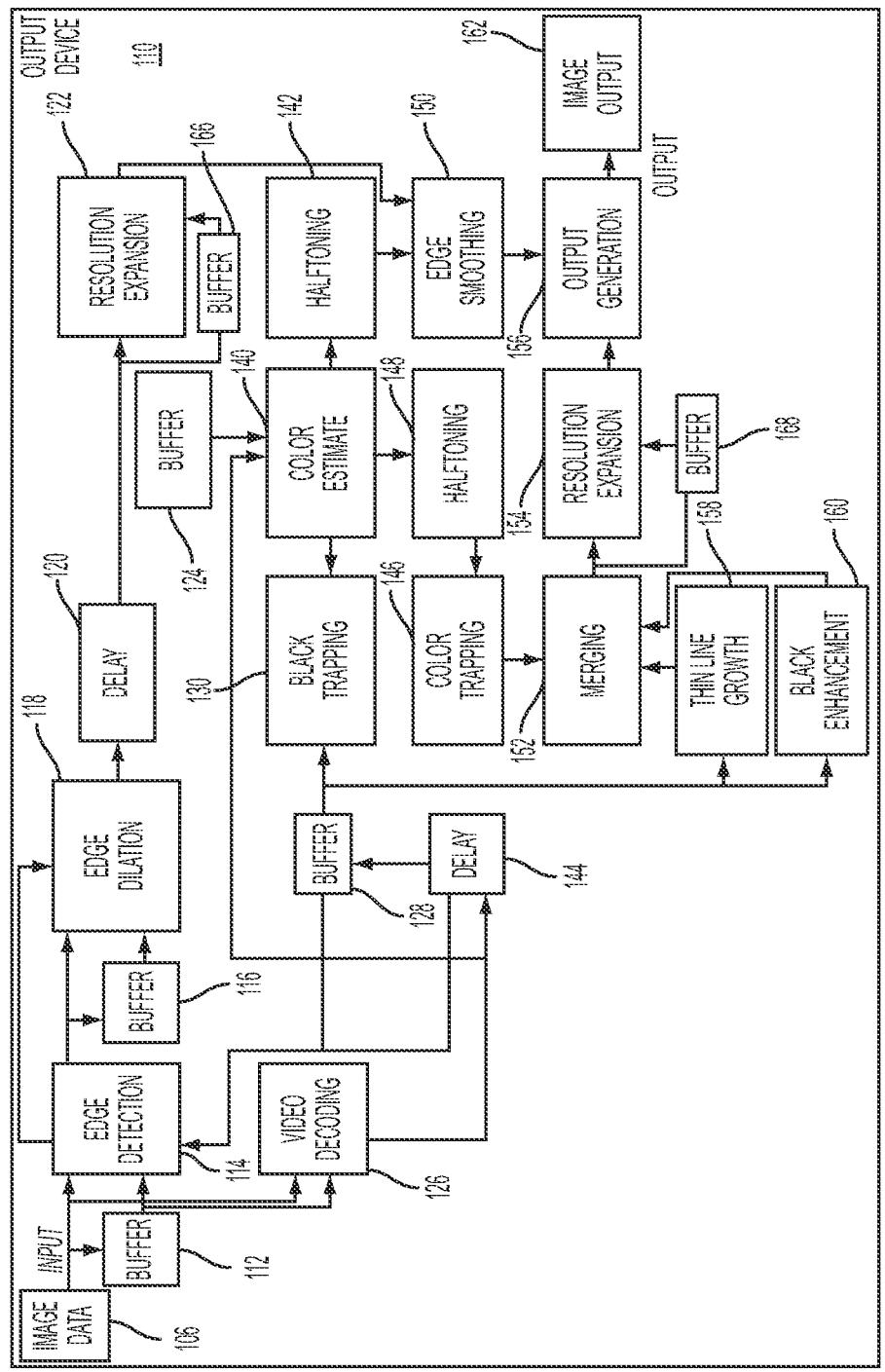
FIG. 2 illustrates various image processing stages, modules, and/or operations, according to various implementations.

According to implementations, and likewise as shown in FIG. 2, the decoded video output can also be transmitted to a black enhancement module 160, to identify black areas in the decoded video output for possible enhancement, such as adding colored pixel values to pure black pixel values to darken an identified black region in printed or other output. In aspects, the black enhancement module 160 and/or other hardware, software, logic, application and/or service can be or include devices, platforms, logic, and/or techniques such as those described in co-pending U.S. patent application Ser. No. 12/884,311, filed Sep. 17, 2010, entitled "SYSTEM AND METHOD FOR ENHANCING THE DENSITY OF BLACK", by Meng Yao, now published on Mar. 22, 2012 as U.S. Publication No. US-2012-0069357-A1, which application is assigned or under obligation of assignment to the same entity as this application, and which application is incorporated herein by reference in its entirety. In aspects, the black enhancement module 160 and/or other hardware, software, logic, application and/or service can also or instead include other devices, platforms, logic, and/or techniques.

According to aspects, the decoded video output from the video decoding module 126 and/or other hardware, software, logic, application, and/or service can also be transmitted to a color estimate module 140, to perform color estimate and related operations. In aspects, the color estimate module 140 and/or other hardware, software, logic, application and/or service can be or include devices, platforms, logic, and/or techniques to estimate continuous tone (contone) and/or other color values or representations of the decoded video output and/or other signals or outputs. The color estimate output generated by the color estimate module 140 and/or other hardware, software, logic, application and/or service can be transmitted to the black trapping module 130 and/or other hardware, software, logic, application and/or service, and/or to a halftoning module 142, as shown. In aspects, the halftoning module 142 and/or other hardware, software, logic, application and/or service can receive image-related input, and generate a halftone representation of that input, including output areas based on binary pixel values whose density is controlled to create perceived shading effects, as understood by persons skilled in the art.

According to aspects, in one image path, the halftone output generated by the halftoning module 142 and/or other hardware, software, logic, application and/or service can be transmitted to a color trapping module 146, which can operate on the halftone output produced by the halftoning module 142 and/or other hardware, software, logic, application and/or service to estimate color values for regions of the decoded video output as received in the color trapping module 146. In aspects, the color trapping module 146 and/or other hardware, software, logic, application and/or service can be or include devices, platforms, logic, and/or techniques such as those described in co-pending U.S. patent application Ser. No. 12/434,824, filed May 4, 2009, entitled "COLOR TRAPPING ON A HALFTONED BI-LEVEL BITMAP", by Meng Yao, now published on Nov. 4, 2012 as U.S. Publication No. US-2010-0277770-A1, which application is assigned or under obligation of assignment to the same entity as this application, and which application is incorporated herein by reference in its entirety. In aspects, the edge smoothing module 150 and/or other hardware, software, logic, application and/or service can also or instead include other devices, platforms, logic, and/or techniques.

According to implementations as shown, the color trapping output of the color trapping module 146 and/or other hardware, software, logic, application and/or service can be transmitted to a merging module 152, which operates to combine two or more graphic and/or video signals into a merged, combined, and/or otherwise composite image. In aspects, and as also shown, the merging module 152 can be configured to also receive the black enhancement output generated by the black enhancement module 160 and/or other hardware, software, logic, application and/or service, as well as the thin line growth output generated by the thin line growth module 158 and/or other hardware, software, logic, application and/or service, as well as the color trapping output generated by the color trapping module 146 and/or other hardware, software, logic, application and/or service. According to aspects, the merging module 152 can operate to generate a combined decoded video output, in which the image features contributed by the color trapping module 146 and/or other hardware, software, logic, application and/or service, the black enhancement module 160 and/or other hardware, software, logic, application and/or service, the thin line growth module 158 and/or other hardware, software, logic, application and/or service, and/or other modules or sources are combined, merged, and/or otherwise processed into an adjusted video output.

According to aspects, the adjusted video output can be transmitted to a resolution expansion module 154, to increase the pixel dimensions and/or other resolution attributes of the adjusted video output. In aspects, the resolution expansion module 154 and/or other hardware, software, logic, application and/or service can be configured to operate when the output resolution of the output device 110 is greater than that of the source image data 106 itself, and/or at other times. According to aspects in further regards, the resolution expansion module 122 can expand, increase, and/or otherwise enhance the resolution of the adjusted or enhanced image data 106, such as by increasing the total number of pixels representing the image data 106. In aspects, the resolution of the enhanced or adjusted image data 106 can be performed by a variety of operations such as pixel interpolation and other techniques, as understood by persons skilled in the art.

According to aspects, the color estimate output generated by the color estimate module 140 and/or other hardware, software, logic, application and/or service can also be transmitted to a halftoning module 142, which can operate to generate halftone output in the same or similar manner as halftoning module 148 and/or other hardware, software, logic, application and/or service. The output of the halftoning module 148 can however in aspects be used for trapping operations, as described herein, in contrast to the output of the halftoning module 142, which in aspects can be used for rendering of edge pixels. The halftone output of the halftoning module 142 and/or other hardware, software, logic, application and/or service can be transmitted, along with output of the resolution expansion module 122 and/or other hardware, software, logic, application and/or service, to an edge smoothing module 150. The edge smoothing module 150 and/or other hardware, software, logic, application and/or service can in aspects operate to combine the edge halftone pattern with edge tag pixels after resolution expansion. The edge smoothing module 150 can detect, identify, and/or smooth or decrease contrast values at or surrounding edges in the decoded video output, as received in that module. Such operations can be controlled by the combination of all edge-related modules, as well as edge halftone operations. For instance, the darkness of the edge pixels can be controlled by the halftone operation via the color estimate module 140, which can be configured to adjust darkness and apply logic to lighten the edge enhancement effect when other colors are detected in the neighborhood.

According to aspects, in the downstream image path, the output of the resolution expansion module 154 and/or other hardware, software, logic, application and/or service and the edge smoothing module 150 and/or other hardware, software, logic, application and/or service can be transmitted to an output generation module 156. The output generation module 156 and/or other hardware, software, logic, application and/or service can operate to combine and/or otherwise process those two outputs and/or other signals, and generate a finished image output 162.

In aspects, the image output 162 can be used, directly or indirectly, to provide the output or driving signal to produce the printed, displayed, transmitted, and/or other output of the output device 110. Because, among other things, data related to the subject image data is preserved, maintained, stored, and/or shared along various branches of multiple image paths in the output device 110, including paths associated with the edge detection module 114 and/or other hardware, software, logic, application, and/or service and the video decoding module 126 and/or other hardware, software, logic, application, and/or service, redundant image processing workloads can be avoided, and more efficiency in output operations can be achieved. In addition, in part because of the reduction in processing overhead, a user operating the device 110 can enjoy greater flexibility and variety in their configuration settings for a desired image output, without sacrificing ultimate image output quality. Other benefits may be achieved.

In terms of physical and/or logical configuration of the modules and image paths incorporated in the output device and shown in FIG. 2, it will be appreciated that the illustrative arrangement and architecture is exemplary, and other configurations, orderings, and/or arrangements are possible. For instance, in implementations, it may be possible to place the resolution enhancement module 122 and/or resolution enhancement module 154 at the end of the set of image pathways of the output device 110, for instance, after the output generation module 156.

Figure 3A:
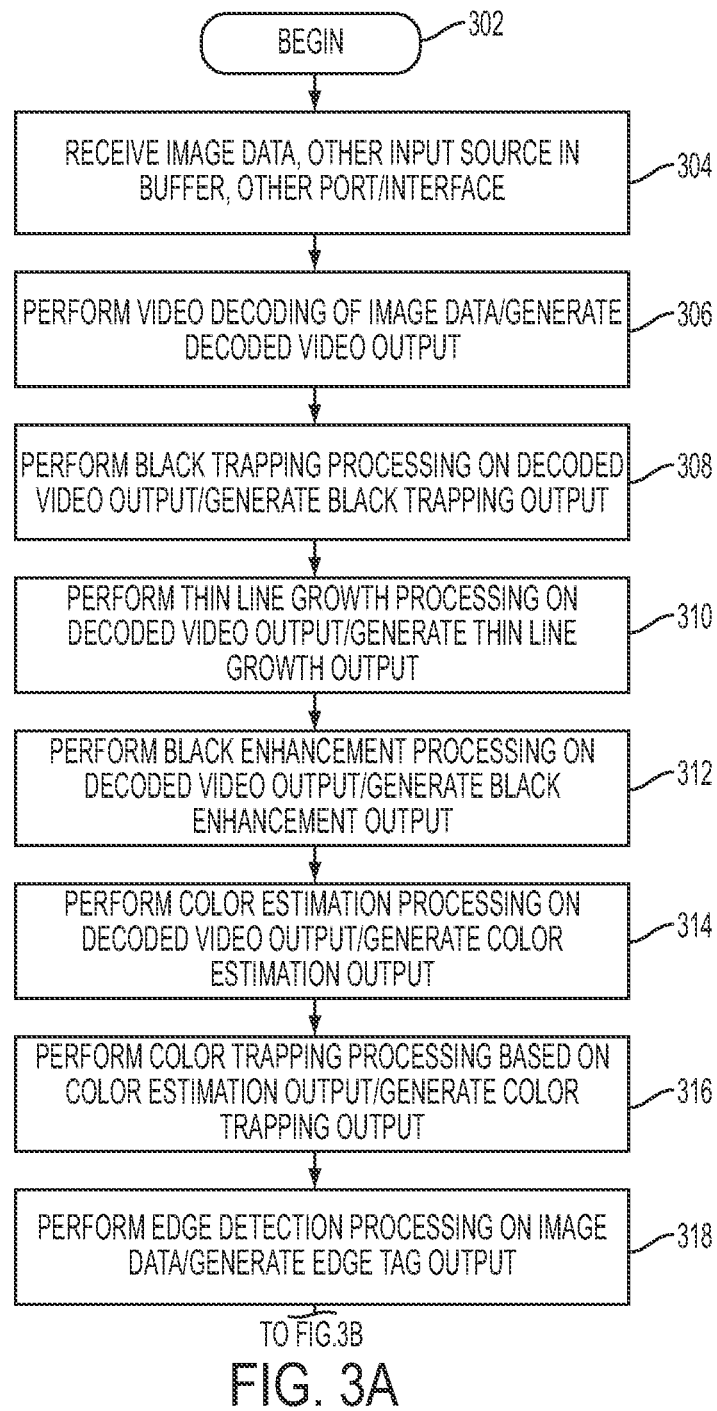
FIG. 3 illustrates a flowchart of overall image processing operations that can be used in systems and methods for a computation-efficient image processing system architecture, according to various implementations.
Figure 3B:
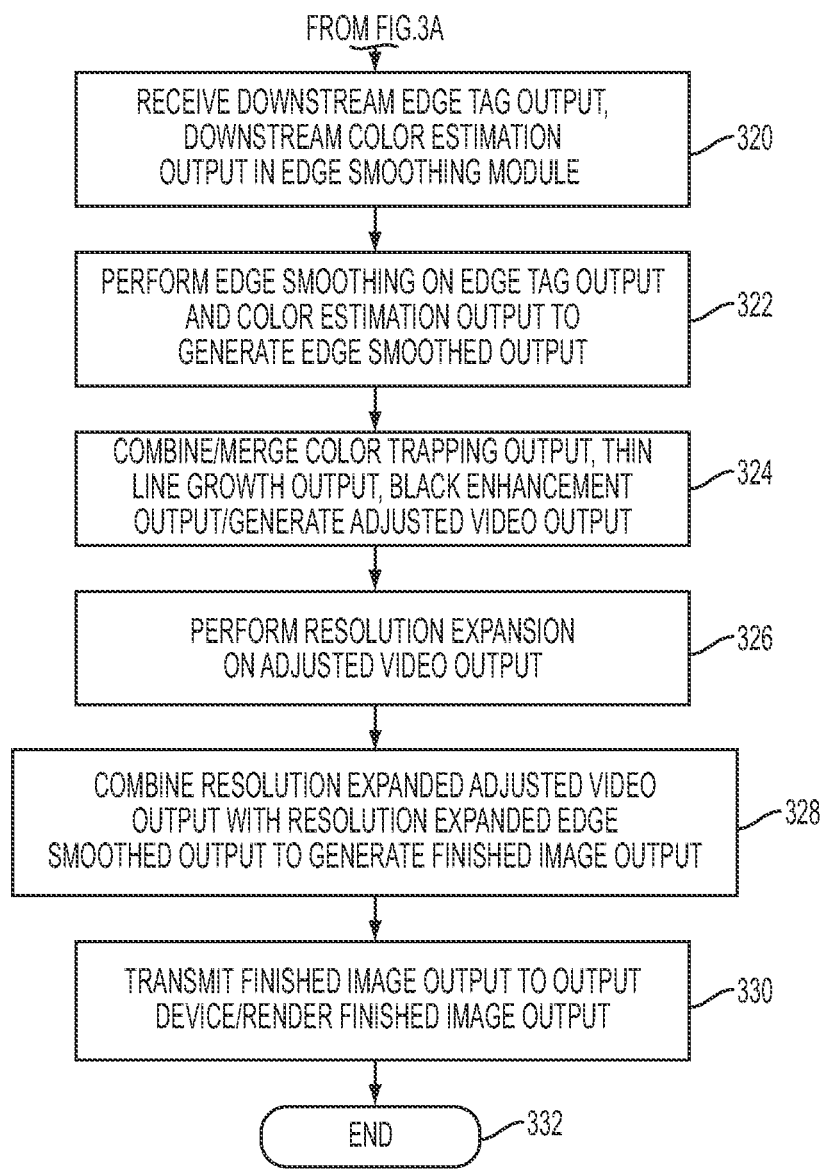

FIG. 3 illustrates a flowchart of image processing and other associated workloads that can be performed in systems and methods for a computation-efficient image processing system architecture, according to aspects. In 302, processing can begin. In 304, the output device 110 can receive the image data 106 and/or other image data or source in buffer 112 and/or other port, circuit, and/or interface. In aspects, the image data 106 can, for instance, be retrieved from hard disk or other storage on a desktop or laptop computer, be retrieved from a Web site and/or other online or networked service, and/or be accessed from other sources or data stores. In 306, the video decoding module 126 and/or other hardware, software, logic, application, and/or service can perform video decoding of the image data and/or other input data, and generate a decoded video output based on that video file or inputs. For instance, the decoded video output can be or include a video output encoded in a binary format, and/or other formats or representations. In 308, the black trapping module 130 and/or other hardware, software, logic, application and/or service can perform black trapping processing on the decoded video output, and generate black trapping output based on those operations.

In 310, the thin line growth module 158 and/or other hardware, software, logic, application and/or service can perform thin line growth processing on the decoded video output, and generate a thin line growth output, based on those operations. In 312, the black enhancement module 160 and/or other hardware, software, logic, application and/or service can perform black enhancement processing on the decoded video output to generate a black enhancement output. In 314, the color estimate module 140 and/or other hardware, software, logic, application and/or service can perform color estimation processing on the decoded video output to generate a color estimate output, based on those operations. In 316, the color trapping module 146 and/or other hardware, software, logic, application and/or service can perform color trapping processing on the decoded video output, and generate a color trapping output based on those operations. In 318, the edge detection module 114 and/or other hardware, software, logic, application, and/or service can perform edge detection operations on the image data 106 and/or other image representation, object, and/or source, and generate an edge tag output based on those operations. In aspects, the edge tag output can include tags and/or other metadata or attributes identifying areas of the image data 106 which contain or represent edges, which can be detected by a variety of techniques, including the identification of high-contrast regions of the subject image, and/or others.

In 320, the downstream edge tag output and the halftoned color estimation output (downstream of the halftoning module 142) can be received and/or processed in the edge smoothing module 150, for instance in parallel fashion. In implementations, the edge tag output may be subjected to operations by the resolution expansion module 122, before being transmitted to the edge smoothing module 150 and/or other hardware, software, logic, application and/or service. In addition or instead, in implementations, the color estimate output may be subjected to operations by the halftoning module 142, before being transmitted to the edge smoothing module 150 and/or other hardware, software, logic, application and/or service. In 322, the edge smoothing module 150 and/or other hardware, software, logic, application and/or service can perform edge smoothing operations on the edge tag output along with the color estimation output, to generate an edge smoothed output as a result of those operations.

In 324, the color trapping output, the thin line growth output, and/or black enhancement output can be combined, merged, and/or otherwise processed in or by the merging module 152 to produce an adjusted video output. In aspects, the adjusted video output can represent an enhanced, sharpened, modified, and/or otherwise adjusted video output or signal generated from the original decoded video output produced by the video decoding module 126 and/or other hardware, software, logic, application, and/or service. According to aspects, it will be appreciated that other outputs, signals, and/or components thereof can be merged in or by the merging module 152. In 326, a resolution expansion module 154 can perform a resolution enhancement operation on the adjusted video output, which operation can, again, be used to expand or enhance the pixel and/or other resolution of the decoded video output and/or versions thereof to match the resolution of the output device 110. In implementations, the resolution expansion module 154 can likewise receive previous image data via buffer 168, which can again be or include a scan line buffer. In aspects, the resolution expansion module 154 can generate a resolution expanded adjusted video output based on those operations.

In 328, an output generation module 156 can process the resolution expanded adjusted video output and the edge smoothed output, thereby merging downstream versions of the original image data 106 and various representations thereof in an image output 162, which can be or include a set of image data, file, and/or data stream representing the processing image information. In 330, the output generation module 156 can transmit the finished image output 162 to a print driver, print engine, video driver, and/or other output stage to produce the desired printed, displayed, and/or other output of the image output 162. In aspects, the finished image output 162, and/or components thereof, and can also be stored in the output device 110 or otherwise for later retrieval, re-printing, and/or other operations. In 332, processing can repeat, return to a prior processing point, jump to a further processing point, or end. In aspects, it will be appreciated that while the flow diagram of FIG. 3 enumerates various processing stages that can take place on the image data 106 and various representations and processed versions thereof, that in implementations, processing stages can take place in different orders, at different times, and/or along different image paths than that illustratively described. Similarly, while implementations shown in FIG. 2, described or notated in FIG. 3, or otherwise, have been illustrated using various buffers and delays in the image path, it will be appreciated that other arrangements of buffers, delays, and other circuits or modules can be used.

Figure 4:
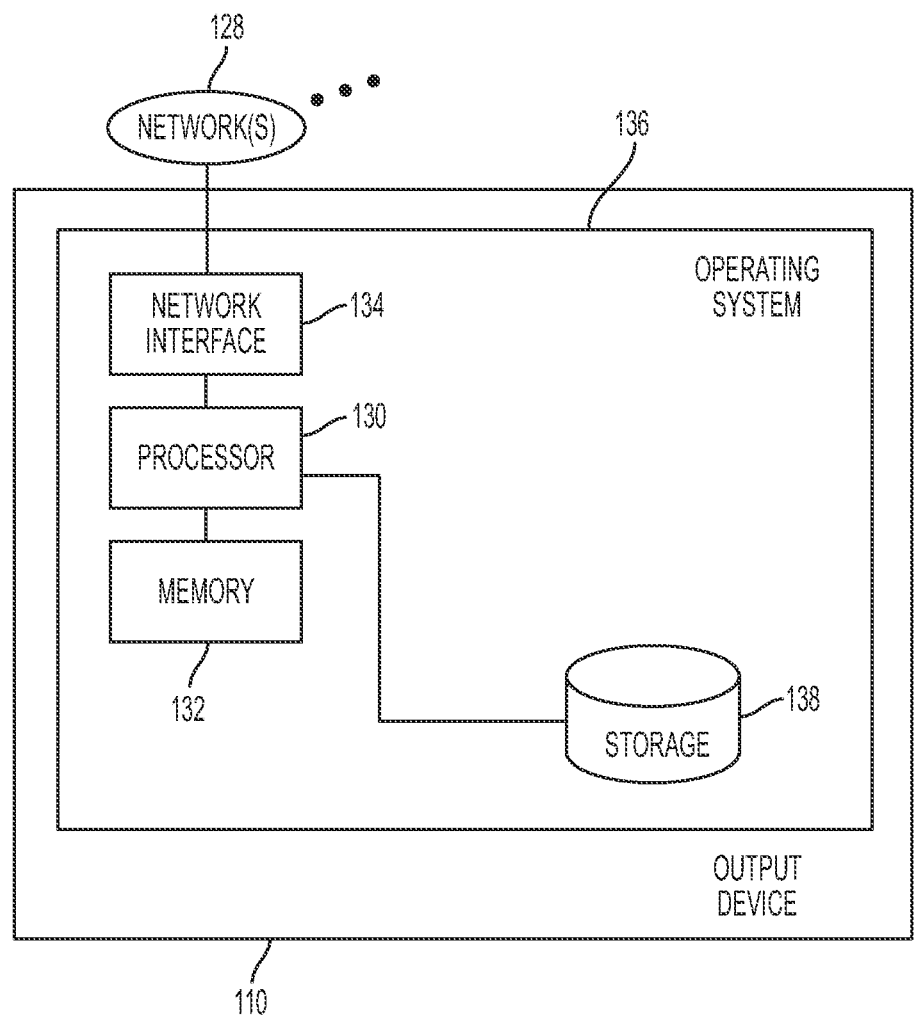
FIG. 4 illustrates exemplary hardware, software, and other resources that can be used in a computation-efficient image processing system architecture, according to various implementations.

FIG. 4 illustrates various hardware, software, and other resources that can be used in implementations of systems and methods for a computation-efficient image processing system architecture, according to embodiments. In embodiments as shown, the output device 110 can comprise a platform including processor 130 communicating with memory 132, such as electronic random access memory, operating under control of or in conjunction with an operating system 136. The processor 130 in embodiments can be incorporated in one or more servers, clusters, and/or other computers or hardware resources, and/or can be implemented using cloud-based resources. The operating system 136 can be, for example, a distribution of the Linux™ operating system, the Unix™ operating system, or other open-source or proprietary operating system or platform. The processor 130 can further communicate with storage 138, such as a local hard drive, as well as a network interface 134, such as an Ethernet or wireless data connection, which in turn communicates with the one or more networks 128, such as the Internet or other public or private networks. The processor 130 can, in general, be programmed or configured to execute control logic and control image processing operations and related logic in the output device 110. In aspects, the image source 102 can be or include resources similar to those of the output device 110, and/or can include additional or different hardware, software, and/or other resources. Other configurations of the output device 110, associated network connections, and other hardware, software, and service resources are possible.

The foregoing description is illustrative, and variations in configuration and implementation may occur to persons skilled in the art. For example, while implementations have been described in which the output device incorporates one edge detection module 114 and one video decoding module 126, in implementations, either of those modules, and/or others described herein, can be implemented in the form of multiple hardware and/or software modules.

Similarly, while implementations have been described wherein the edge detection module 114, the video decoding module 126, and other modules are incorporated directly within the output device 110, in implementations, those modules and/or others can be implanted as external hardware, software, and/or services to the output device 110. Other resources described as singular or integrated can in embodiments be plural or distributed, and resources described as multiple or distributed can in embodiments be combined. The scope of the present teachings is accordingly intended to be limited only by the following claims.

What is claimed is:

1. A method of processing image information, comprising:
   accessing an image source to receive image data;
   performing a video decoding operation on the image data to generate a decoded video output;
   performing, on the decoded video output, at least— a black trapping operation to locate black areas of the decoded video output and generate a black trapping output, a thin line growth operation to generate a thin line growth output, a black enhancement operation to generate a black enhancement output, and a color estimation operation to generate a color estimation output;

combining at least the black trapping output, the thin line growth output, and the black enhancement output to generate an adjusted video output;

performing, in parallel with the video decoding operation, an edge detection operation on the image data to generate an edge tag output;

performing an edge smoothing operation based on the edge tag output and the color estimation output to generate an edge smoothed output; and merging the adjusted video output and the edge smoothed output to generate a finished image output.

2. The method of claim 1, wherein the image source comprises at least one of an application, a database, an online service, a networked wireless device, or an imaging device.

3. The method of claim 1, wherein accessing an image source to receive image data comprises buffering the image data.

4. The method of claim 1, wherein the video decoding operation comprises a binary conversion video decoding operation.

5. The method of claim 1, further comprising performing a resolution enhancement operation on the adjusted video output to generate a resolution enhanced adjusted video output.

6. The method of claim 5, wherein the resolution enhancement operation on the adjusted video output is performed before merging the adjusted video output with the edge smoothed output.

7. The method of claim 1, further comprising performing at least one of a black trapping operation or a color trapping operation on the color estimation output.

8. The method of claim 5, wherein the merging the adjusted video output and the edge smoothed output comprises merging the resolution enhanced adjusted video output and a resolution enhanced edge smoothed output.

9. A system, comprising:
a network interface to an image source; and
a processor, communicating with the image source via the network interface, the processor being configured to—
access image data from the image source,
perform a video decoding operation on the image data to generate a decoded video output,
perform, on the decoded video output, at least—
a black trapping operation to locate black areas of the decoded video output and generate a black trapping output,
a thin line growth operation to generate a thin line growth output,
a black enhancement operation to generate a black enhancement output, and
a color estimation operation to generate a color estimation output,
combine at least the black trapping output, the thin line growth output, and the black enhancement output to generate an adjusted video output,
perform, in parallel with the video decoding operation, an edge detection operation on the image data to generate an edge tag output,
performing an edge smoothing operation based on the edge tag output and the color estimation output to generate an edge smoothed output, and
merge the adjusted video output and the edge smoothed output to generate a finished image output.

10. The system of claim 9, wherein the image source comprises at least one of an application, a database, an online service, a networked wireless device, or an imaging device.

11. The system of claim 9, wherein accessing an image source to receive image data comprises buffering the image data.

12. The system of claim 9, wherein the video decoding operation comprises a binary conversion video decoding operation.

13. The system of claim 9, wherein the processor is further configured to perform a resolution enhancement operation on the adjusted video output to generate a resolution enhanced adjusted video output.

14. The system of claim 13, wherein the resolution enhancement operation on the adjusted video output is performed before merging the adjusted video output with the edge smoothed output.

15. The system of claim 9, wherein the processor is further configured to perform at least one of a black trapping operation or a color trapping operation on the color estimation output.

16. The system of claim 13, wherein the merging the adjusted video output and the edge smoothed output comprises merging the resolution enhanced adjusted video output and a resolution enhanced edge smoothed output.

* * * * *